(12) United States Patent
Sakaue et al.

(10) Patent No.: US 7,450,146 B2
(45) Date of Patent: Nov. 11, 2008

(54) OPTICAL SCANNING DEVICE INCLUDING PLURAL LIGHT SHIELDING UNITS PROVIDED AT DIFFERENT HEIGHTS AND IMAGE FORMING APPARATUS

(75) Inventors: Yoshinobu Sakaue, Tokyo (JP); Kazunori Bannai, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 11/503,964

(22) Filed: Aug. 15, 2006

(65) Prior Publication Data

US 2007/0053040 A1 Mar. 8, 2007

(30) Foreign Application Priority Data

Sep. 6, 2005 (JP) .............................. 2005-257804

(51) Int. Cl.
*B41J 2/435* (2006.01)
*G02B 26/08* (2006.01)
(52) U.S. Cl. ........................................ 347/263; 359/196
(58) Field of Classification Search ......... 359/196–226; 347/233, 241–243, 170, 138
See application file for complete search history.

(56) References Cited

U.S. PATENT DOCUMENTS

| 6,697,092 | B2 | 2/2004 | Bannai |
|---|---|---|---|
| 6,786,590 | B2 | 9/2004 | Maki |
| 6,836,633 | B2 | 12/2004 | Bannai |
| 6,891,559 | B1 | 5/2005 | Bannai |
| 2004/0100550 | A1 | 5/2004 | Bannai |
| 2005/0093968 | A1* | 5/2005 | Iwamoto ..................... 347/238 |
| 2005/0174418 | A1 | 8/2005 | Sakaue |
| 2006/0055769 | A1 | 3/2006 | Yamazaki |

FOREIGN PATENT DOCUMENTS

| JP | 2002-196269 A | 7/2002 |
|---|---|---|
| JP | 2003-202512 | 7/2003 |

* cited by examiner

*Primary Examiner*—Stephone B. Allen
*Assistant Examiner*—Jennifer L Doak
(74) *Attorney, Agent, or Firm*—Harness Dickey & Pierce, P.L.C.

(57) ABSTRACT

An optical scanning device includes a plurality of light sources, a deflector, optical systems, and a plurality of light shielding units to shield flare light from an opposite optical system. Two light shielding units are arranged not to satisfy θ=n(360/x) degrees, where θ is an angle formed by a line from a portion of one light shielding unit nearest the deflector to a rotation axis of the deflector and a line from a portion of the other light shielding unit nearest the deflector to the rotation axis of the deflector with the rotation axis of the deflector being an apex angle, x is the number of mirror faces of the deflector, and n is an integer not more than x.

10 Claims, 9 Drawing Sheets

OPTICAL SCANNING DEVICE INCLUDING PLURAL LIGHT SHIELDING UNITS PROVIDED AT DIFFERENT HEIGHTS AND IMAGE FORMING APPARATUS

CROSS-REFERENCE TO RELATED APPLICATIONS

The present document incorporates by reference the entire contents of Japanese priority document, 2005-257804 filed in Japan on Sep. 6, 2005.

BACKGROUND OF THE INVENTION

1. Field of the Invention

The present invention relates to an optical scanning device that irradiates a photoconductor with light beams to form an electrostatic latent image thereon, and an image forming apparatus using the optical scanning device.

2. Description of the Related Art

There have been image forming apparatuses such as a printer and a copying machine, which include an optical scanning device. The optical scanning device includes a light source that emits light beams (for example, laser beams) corresponding to image data, and a deflector that deflects and scans the light beams, thereby irradiating a photoconductor with linear light beams. In the image forming apparatus, for example, the deflector reflects light beams to irradiate the photoconductor and forms an electrostatic latent image on the photoconductor. Then, toner is supplied to the photoconductor to develop the electrostatic latent image into a toner image. A transfer device transfers the toner image formed on the photoconductor to a recording medium. After that, a fixing unit fixes the toner image on the recording medium, and the recording medium is ejected from the image forming apparatus.

Recently, an optical scanning system is applied to image forming apparatuses that include a plurality of photoconductors. In the optical scanning system, light beams emitted from a plurality of light sources are separated almost symmetrically and deflection-scanned. This system requires a very complicated configuration where many optical systems are arranged in a single housing.

In such an optical scanning device, it is essential to prevent unnecessary reflected light and scattered light (flare light) from reaching the surface of the photoconductor. In the aforementioned optical scanning system, flare light reflected by an optical system often passes through another optical system on the opposite side, and reaches the surface of the photoconductor. It is particularly important to remove the flare light passing near a deflector. Japanese Patent Application Laid-Open Nos. 2002-196269 and 2003-202512 disclose a conventional image forming apparatus that includes a light shielding member.

The conventional image forming apparatus is capable of shielding light; however, noise generated between an apex of a polygon rotor of the deflector and the light shielding member, and a windage loss during rotation of the deflector increase due to the light shielding member arranged near the deflector.

SUMMARY OF THE INVENTION

It is an object of the present invention to at least partially solve the problems in the conventional technology.

According to an aspect of the present invention, an optical scanning device includes a plurality of light sources that are arranged separately in a height direction, a deflector that includes a polygon mirror, reflects light beams from the light sources on the polygon mirror while rotating, and separates the light beams in two substantially symmetrical directions to obtain deflected light beams, an optical system corresponding to each of the light source that guides each of the deflected light beams of a corresponding light source onto a surface of a corresponding photoconductor to form a latent image on the photoconductor, and a plurality of light shielding units that are located outside a deflection scanning area of the deflected light beams and near the deflector, and shield flare light from an opposite optical system. The light shielding units include first and second light shielding units, which are arranged not to satisfy the following condition:

$$\theta = n(360/x) \text{ degrees}$$

where $\theta$ is an angle formed by a line from a portion of the first light shielding unit nearest the deflector to a rotation axis of the deflector and a line from a portion of the second light shielding unit nearest the deflector to the rotation axis of the deflector with the rotation axis of the deflector being an apex angle, x is number of mirror faces of the polygon mirror, and n is an integer not more than x.

According to another aspect of the present invention, an image forming apparatus includes a photoconductor onto which an electrostatic latent image is written by the optical scanning device, a development unit that develops the electrostatic latent image on the photoconductor into a toner image, a transfer unit that transfers the toner image onto a recording medium, a fixing unit that fixes the toner image on the recording medium, and the above optical scanning device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Figure 1:
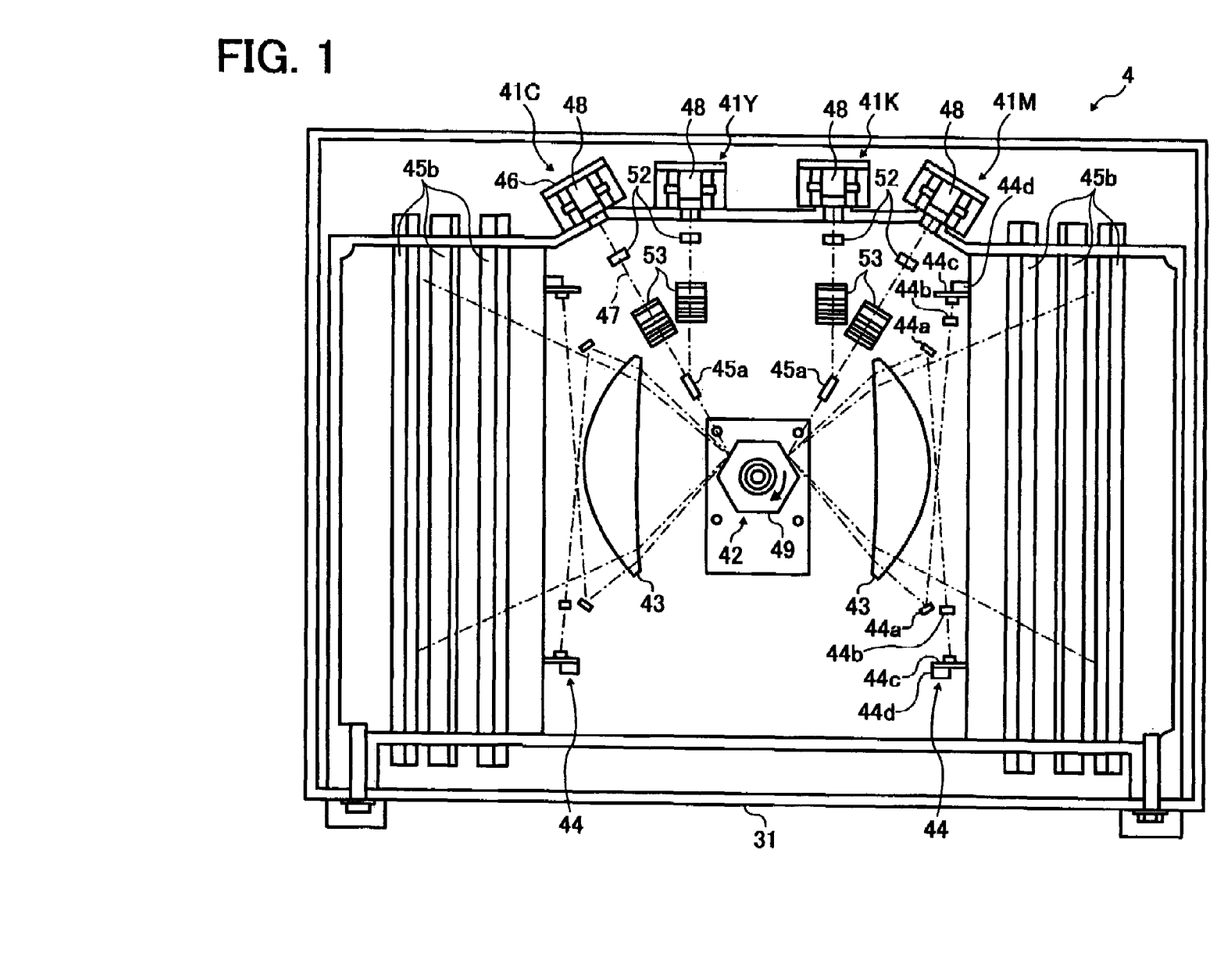
FIG. 1 is a horizontal cross section of a basic configuration of an optical scanning device according to an embodiment of the present invention.
Figure 2:
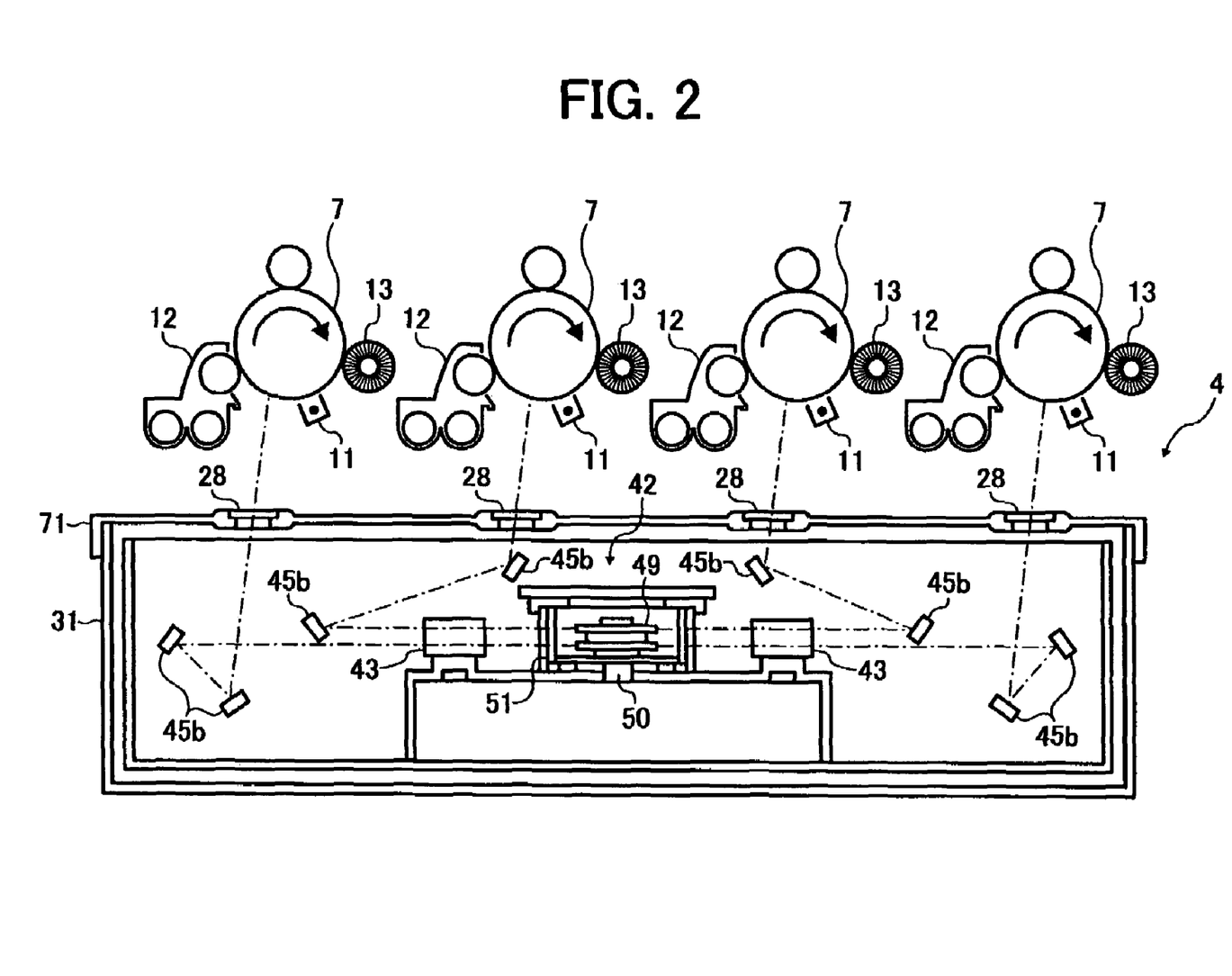
FIG. 2 is a vertical cross section of the basic configuration of the optical scanning device.

FIG. 1 is a horizontal cross section of a basic configuration of an optical scanning device 4. FIG. 2 is a vertical side view of the basic configuration of the optical scanning device 4.

The optical scanning device 4 is a so-called opposed scanning type, and includes, on a housing 31, four laser diode (LD) units 41 (laser light source units 41Y, 41C, 41M, and 41K), a deflector unit 42, imaging optical systems 43, synchronous optical systems 44, and reflection mirrors 45 (45a and 45b). The LD units 41 serve as a light source that emits light beams. The deflector unit 42 deflects light beams from the respective LD units 41 to two symmetrical directions to scan. The imaging optical systems 43 serves as a scanning lens unit including, for example, an fθ lens, which convert deflected and scanned light beams into an image of a desired size on photoconductors 7. The synchronous optical systems 44 detect scanning start timing of the light beams. The reflection mirrors 45 (45a and 45b) reflect and guide the light beams to the photoconductors 7.

The LD unit 41 is configured such that a light source 48, which is a laser light emitting diode, a collimate lens that substantially parallelizes divergent light emitted from the light source 48, and a laser light emitting diode-driving circuit board are held by a holding member 46.

The deflector unit 42 includes a deflector 49, which is a two-stage polygon mirror, a polygon mirror motor 50 that rotates the deflector 49, a soundproof glass 51 that covers the deflector unit 42, and the like.

The synchronous optical system 44 includes an imaging lens 44b, an electric circuit board 44d having a photoelectric element 44c, and a holding member (not shown) that holds these members.

The optical scanning device 4 operates as follows. That is, color-separated image data input from a document reader (scanner) or an image data output device (personal computer, word processor, receiver of fax machine, or the like) (not shown) is converted into a signal for driving a light source, and the light sources 48 in the respective LD units 41 are driven according to the signal to emit light beams. The light beams emitted from the respective LD units 41 reach the deflector unit 42 via an aperture 52 for optical face tangle error correction, a cylindrical lens 53, and the reflection mirror 45a (regarding only the light beams emitted from the LD units 41Y and 41K), and deflected and scanned in two symmetrical directions by the deflector 49 rotated at equal velocity by the polygon mirror motor 50.

The light beams deflected and scanned in two symmetrical directions, two beams each, by the deflector 49 in the deflector unit 42 respectively pass through the imaging optical system 43, are reflected by the reflection mirrors 45b, and are irradiated in a spot on a face to be scanned of the photoconductor 7 for each color via a dustproof member 28, to write an electrostatic latent image thereon. At this time, irradiation angles of four light beams with respect to the photoconductors 7 are substantially the same.

On the other hand, the synchronous optical system 44 that determines the write start timing receives the light beams having passed through the imaging optical system 43, by reflecting the beams by a synchronization detection mirror 44a, to output a synchronization signal for starting scanning. Since the original purpose of synchronization detection is for achieving timing of scanned light, the synchronous optical system 44 generally needs only to be installed so as to receive the light beams prior to scanning. However, to detect a change of speed (or time) of one scan, a detector can be installed at the scanning rear end. FIG. 1 depicts a configuration where synchronization is achieved before and after the scan.

Figure 3:
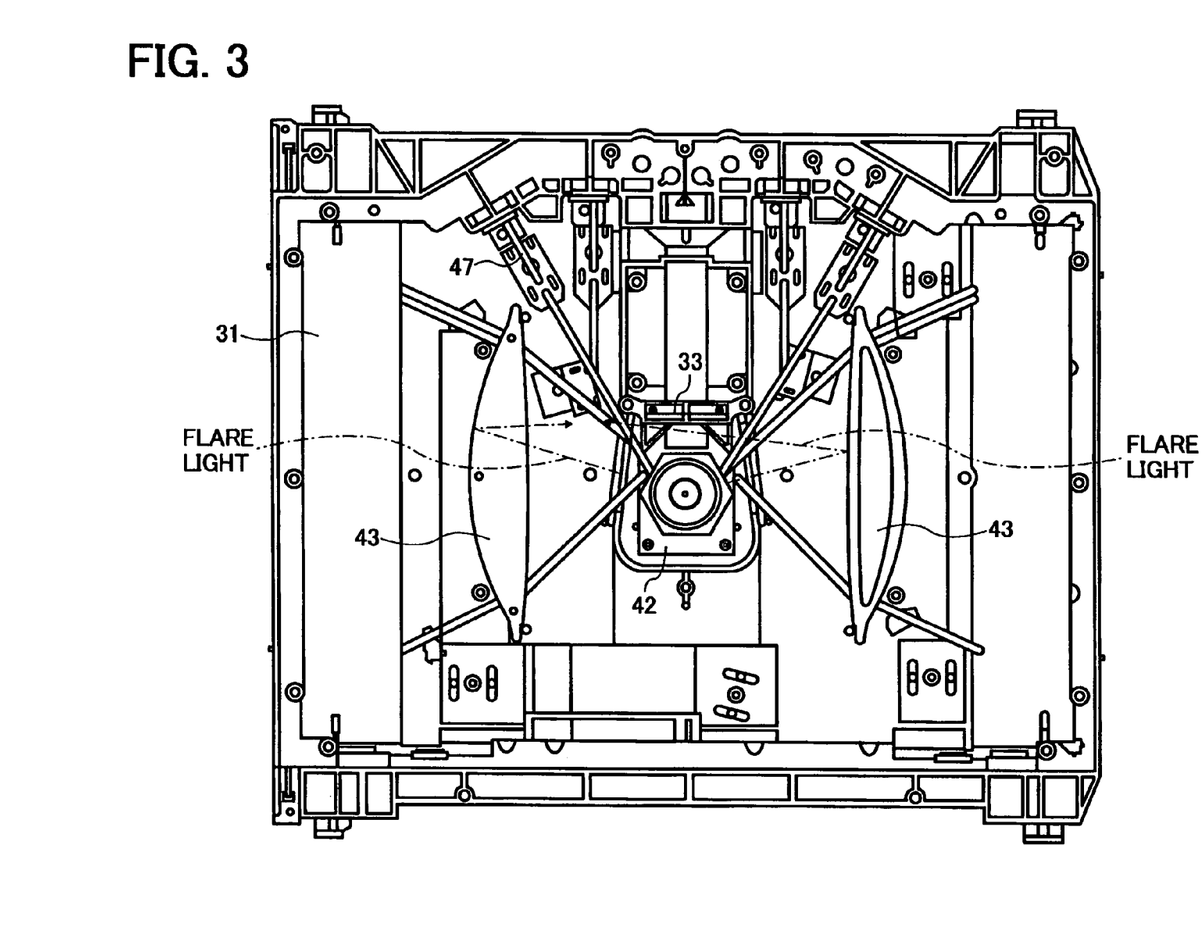
FIG. 3 is an overhead schematic of the optical scanning device.
Figure 4:
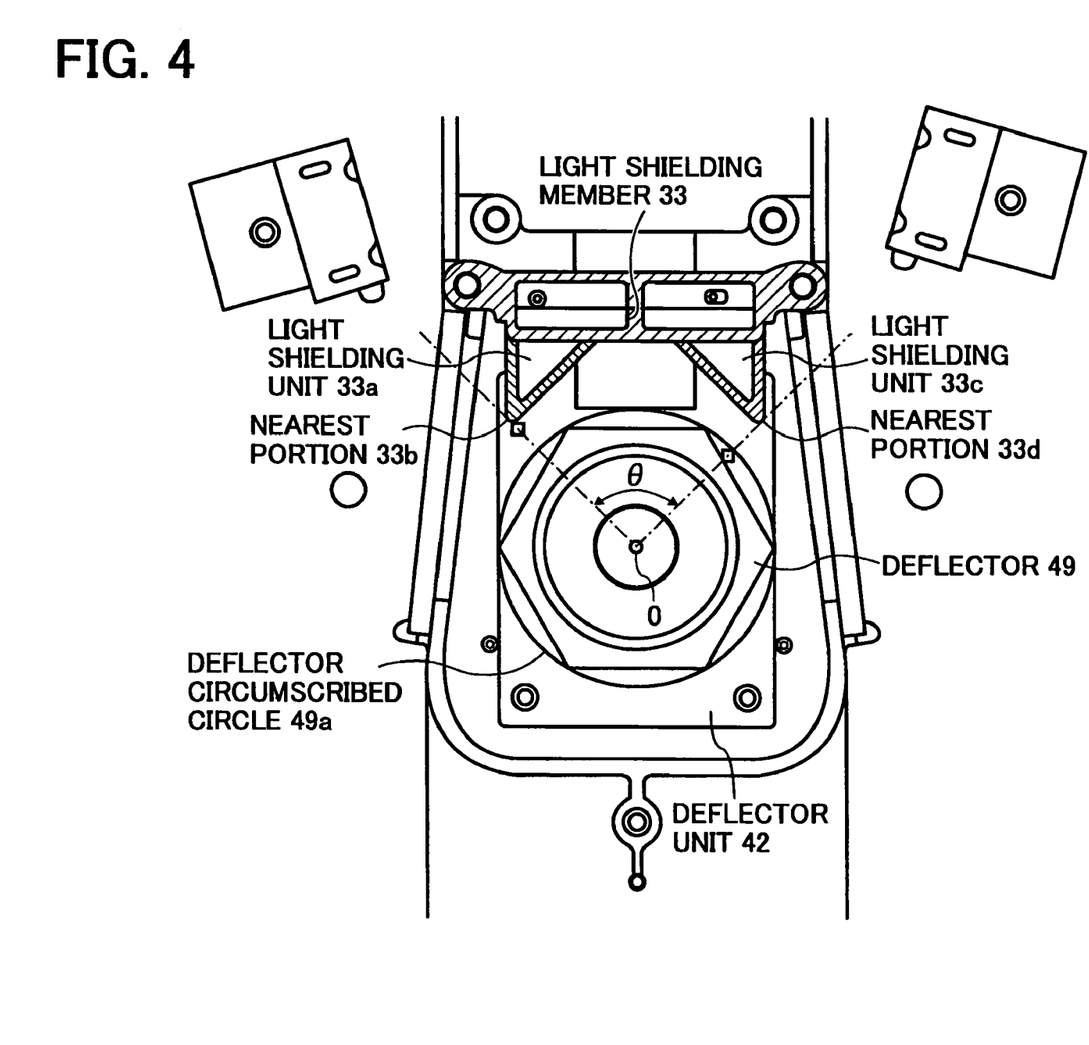
FIG. 4 is a top view of the optical scanning device around a deflector shown in FIG. 3.
Figure 5:
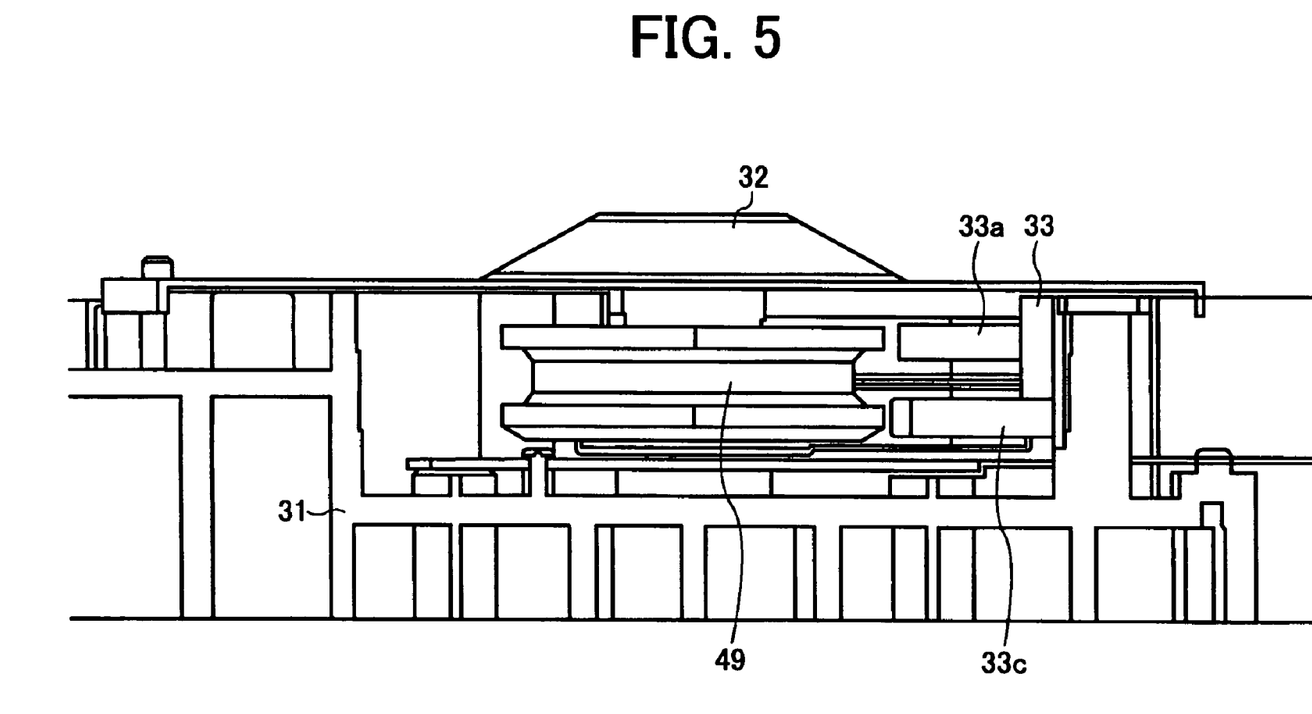
FIG. 5 is a cross section of the optical scanning device around the deflector.

In the following, characteristics of the optical scanning device are explained. FIGS. 3 and 4 are schematics of the deflector 49 and the surroundings as viewed from above the deflector 49, and FIG. 5 is a cross section thereof.

Light beams 47 emitted from the light source 48 are divided and deflected to two symmetric directions for scanning by the deflector 49, pass through the imaging optical system 43, are reflected by the reflection mirror 45b, and are guided to the photoconductor 7. However, the light beams 47 are partly reflected by the surface of the imaging optical system 43 to be flare light. A part of the flare light passes through the soundproof glass 51, passes through the vicinity of the deflector unit 42 and the soundproof glass 51 on the opposite side, and reaches the optical system on the opposite side and then the photoconductor 7 as flare light.

A light shielding member 33 having light shielding units 33a and 33c provided up and down in the height direction is arranged outside of a deflection scanning area near the deflector unit 42 to shield the flare light. The two light shielding units 33a and 33c are integrally formed in one light shielding member 33.

According to the embodiment, the two light shielding units 33a and 33c are arranged not to satisfy the following condition:

$$\theta = n(360/x) \text{ degrees}$$

where θ is an angle formed by a line from a portion 33b of the light shielding unit 33a nearest the deflector 49 to a rotation axis O of the deflector 49 and a line from a portion 33d of the light shielding unit 33c nearest the deflector 49, x is the number of mirror faces of the deflector, and n is an integer not more than x (see FIG. 4). It is preferable to arrange the two light shielding units 33a and 33c so that the angle θ is not equal to or larger than (n−0.1)×(360/x) degrees, and equal to or smaller than (n+0.1)×(360/x) degrees.

If the light shielding units 33a and 33c are arranged close to the deflector 49, which is a polygon rotor rotating at a high speed, air flow generated due to the rotation of the deflector 49 is disturbed, thereby causing noise. The magnitude of the noise changes every moment periodically accompanying the rotation of the deflector 49. However, it is in inverse proportion with a distance between a mirror face of the deflector 49 and the nearest portion of the light shielding unit (for example, in the light shielding unit 33a, a distance L1 between the mirror face of the deflector 49 and the nearest portion 33b of the light shielding unit 33a) on a straight line connecting the center O of rotation of the deflector 49 and the portion of the light shielding unit nearest to the deflector 49 (the end of the light shielding unit).

Figure 6:
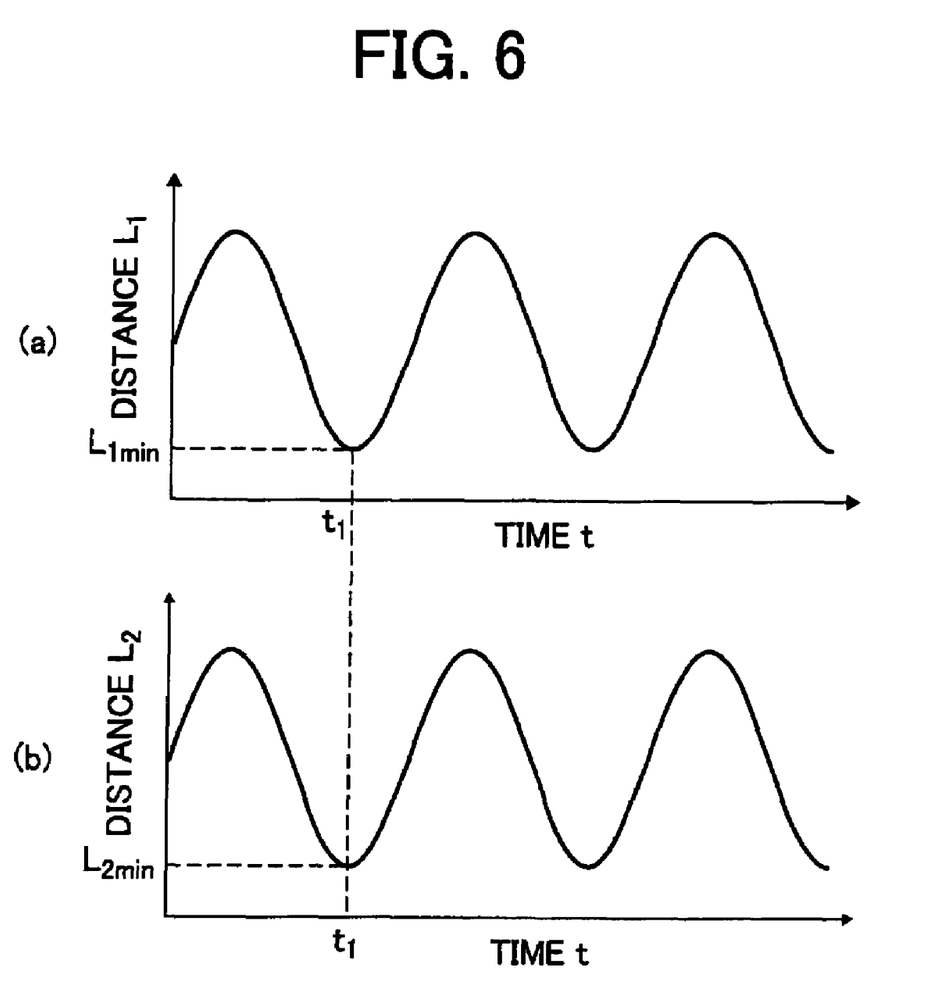
FIG. 6A is a graph of a change with the lapse of time in distance between a mirror face of the deflector and the nearest portion of a light shielding unit shown in FIG. 4.
FIG. 6B is a graph of a change with the lapse of time in distance between a mirror face of the deflector and the nearest portion of another light shielding unit shown in FIG. 4.

At this time, if the two light shielding units 33a and 33c are arranged so that angle θ is n(360/x) degrees (in FIG. 4, for example, 60 degrees, assuming that x=6 and n=1), the distance L1 between the mirror face of the deflector 49 and the nearest portion 33b of the light shielding unit 33a on the straight line connecting the center O of rotation of the deflector 49 and the portion 33b of the light shielding unit 33a nearest to the deflector 49, and a distance L2 between the mirror face of the deflector 49 and the nearest portion 33d of the light shielding unit 33c on the straight line connecting the center O of rotation of the deflector 49 and the portion 33d of the light shielding unit 33c nearest to the deflector 49 change as shown in FIGS. 6A and 6B with the lapse of time t. In the relationship between the time t and the distance L1 (FIG. 6A) and the relationship between the time t and the distance L2 (FIG. 6B), a sine curve is drawn with the distance changing periodically.

The time t1 is the timing when the apex of the polygon deflector 49 approaches the nearest portion 33b of the light shielding unit 33a most and the distance L1 is minimum ($L_{1min}$), and hence, the noise is maximum at this moment in the light shielding unit 33a. On the other hand, at this point in time, the distance L2 is also minimum ($L_{2min}$), and the noise is maximum in the light shielding unit 33c. Therefore, considerable noise is generated around the light shielding member 33, which is not desirable.

As described above, according to the embodiment, the two light shielding units 33a and 33c are arranged such that the apex of the polygon deflector 49 approaches the ends of the light shielding units 33a and 33c most in different timing. Consequently, the times, at which the noise is maximum in the light shielding units 33a and 33c, are shifted from each other, and the noise can be reduced as a whole.

The noise due to the light shielding units 33a and 33c is explained below in more detail.

A composite waveform W of waveforms W1 and W2 of noise generated respectively at the nearest portions 33b and 33d of the light shielding units 33a and 33c can be expressed as follows:

$$W(L,t)=W1(L1,t)+W2(L2,t).$$

In this equation, when it is assumed that distance $L_{1min}=L_{2min}$, and amplitudes of the waveforms W1 and W2 are both 1, if the two waves have the same phase, the amplitude of the composite waveform W is 2, and hence, the noise is maximum. If the two waves have an opposite phase, the amplitude of the composite waveform W is 0, and hence, the noise becomes minimum.

To make the waveforms W1 and W2 have an opposite phase, the two light shielding units 33a and 33c need to be arranged so that the angle θ is: $\theta_1=m\times(180/x)$ degrees (m: odd number equal to or smaller than 2x).

Figure 7:
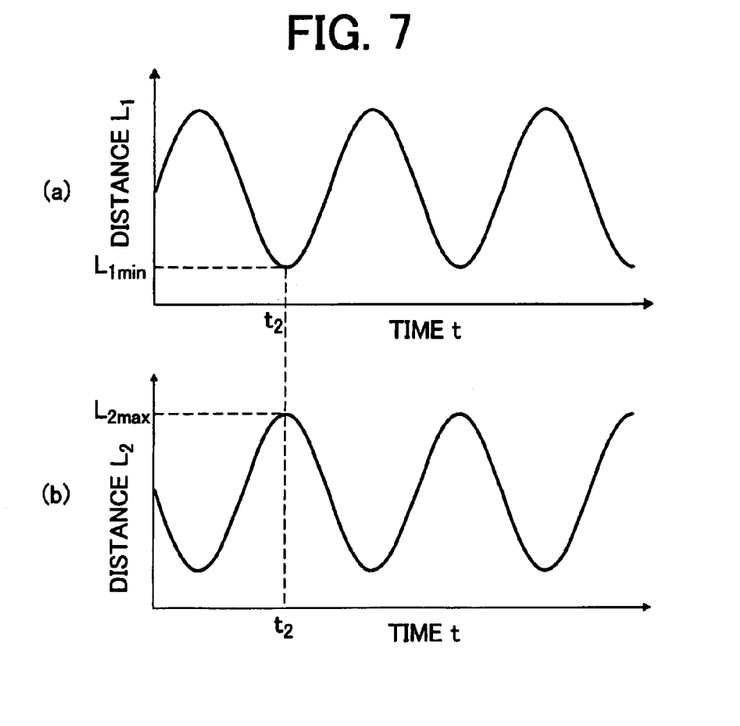
FIG. 7A is another graph of a change with the lapse of time in distance between a mirror face of the deflector and the nearest portion of a light shielding unit.
FIG. 7B is another graph of a change with the lapse of time in distance between a mirror face of the deflector and the nearest portion of another light shielding unit.

FIGS. 7A and 7B are graphs of the relationship between the distances L1 and L2 and the time t when, for example, x=6, m=3, and the two light shielding units 33a and 33c are arranged so that the angle θ is: $\theta_1=90$ degrees (the state shown in FIG. 4). In a curve of time t-distance L1 (FIG. 7A) and in a curve of time t-distance L2 (FIG. 7B), the phase is reversed. In other words, at time t2, since the distance L1 is minimum ($L_{1min}$), noise is maximum at this moment in the light shielding unit 33a, but the distance L2 is maximum ($L_{2max}$), and noise is minimum in the light shielding unit 33c. Accordingly, the noise is reduced most around the light shielding member 33.

In the embodiment, the two light shielding units 33a and 33c are arranged so that the angle θ is within a certain angle range based on $\theta_1=m\times(180/x)$ degrees (m: odd number equal to or smaller than 2x).

Figure 8:
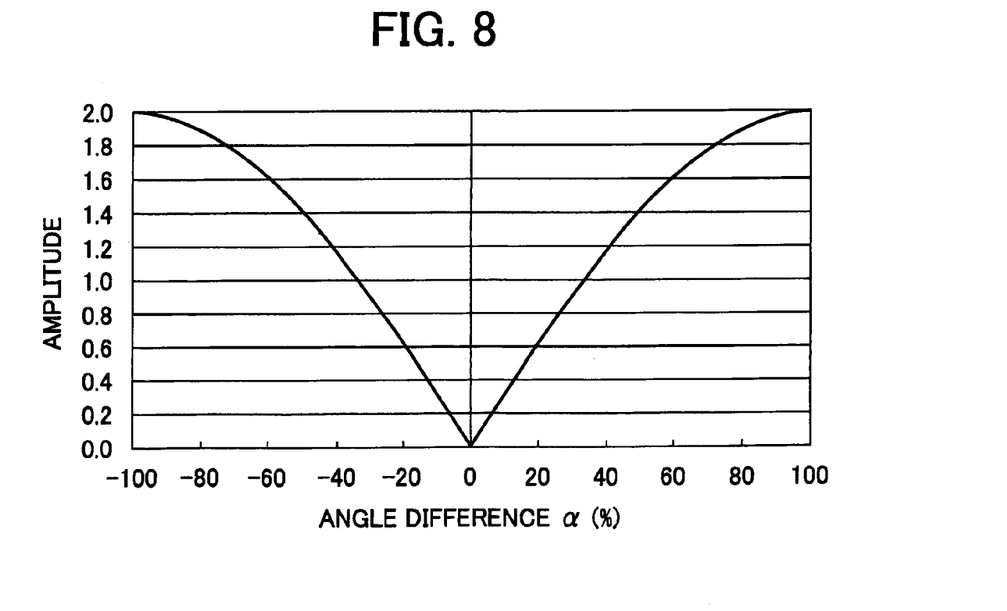
FIG. 8 is a graph of the relationship between an angle difference alpha ($\alpha$) and amplitude of a composite waveform W with respect to an arrangement of the two light shielding units.

FIG. 8 is a graph of the relationship between an angle difference α and an amplitude of the composite waveform W. Here, the angle difference α is a ratio of the angle difference to the angle $\theta_1$ when the two light shielding units 33a and 33c are arranged by changing the angle θ based on $\theta_1=m\times(180/x)$ degrees (m: odd number equal to or smaller than 2x) (angle difference is 0%), and is expressed by $\theta=(m+\alpha/100)\times(180/x)$ degrees. For example, angle difference −20% indicates an example in which the light shielding units 33a and 33c are arranged so that the angle θ is (m−0.2)×(180/x) degrees.

In the embodiment, it is preferable to arrange the light shielding units 33a and 33c so that the amplitude of the combined wave is smaller by mutual canceling of the waveforms W1 and W2 with respect to the amplitude of the larger waveform of the waveforms W1 and W2 (when the size of the waveform is the same, the amplitude thereof).

With reference to FIG. 8, it can be seen that the amplitude exceeds 1 around the angle difference ±40% (0.4). That is, when the angle difference exceeds ±40% (0.4), the amplitude of the composite waveform W exceeds 1, and exceeds the amplitude of the waveforms W1 and W2, which means that the effect of canceling at the time of combining two waveforms cannot be obtained. Such an arrangement of the light shielding units 33a and 33c is not desirable.

From such a relationship, it is preferable to arrange the two light shielding units 33a and 33c so that the angle θ is equal to or larger than (m−0.4)×(180/x) degrees and equal to or smaller than (m+0.4)×(180/x) degrees (m: odd number equal to or smaller than 2x). Regarding the arrangement of the two light shielding units 33a and 33c, it is more preferable to arrange the two light shielding units 33a and 33c so that the angle θ is equal to or larger than (m−0.3)×(180/x) degrees and equal to or smaller than (m+0.3)×(180/x) degrees (m: odd number equal to or smaller than 2x), and most preferable to arrange the two light shielding units 33a and 33c so that the angle θ is equal to or larger than (m−0.2)×(180/x) degrees and equal to or smaller than (m+0.2)×(180/x) degrees (m: odd number equal to or smaller than 2x). Accordingly, the timing when the apex of the polygon deflector 49 approaches the ends of the light shielding units 33a and 33c can be shifted largely, thereby reducing noise.

A gap between a circumscribed circle 49a of the deflector unit 42 and the nearest portions 33b and 33d, as shown in FIG. 4 is not necessarily completely eliminated, due to image height generated by the flare light. In other words, the distances L1 and L2 may not be zero. It is also effective to finely adjust the positions of the nearest portions 33b and 33d to positions where the influence of the flare light does not appear in the image, since it leads to reduction of noise.

Preferably, as shown in FIG. 5, the light shielding unit 33a of the two light shielding units 33a and 33c shields only a height region (in FIG. 5, upper part) where the deflector 49 reflects light beams from one light source, and the light shielding unit 33c shields only a height region (in FIG. 5, lower part) where the deflector 49 reflects light beams from another light source. Besides, the light shielding units 33a and 33c are arranged with a gap therebetween in a height direction. Further, it is also preferable that the thickness (width) of the light shielding units 33a and 33c in the height direction is about that of the mirror of the deflector 49, or thicker than that by about 1 millimeter.

As a result, a region that disturbs the air flow caused by the rotation of the deflector 49 can be reduced, and a rectification effect of the air flow can be obtained, thereby reducing noise and a windage amount.

Figure 9:
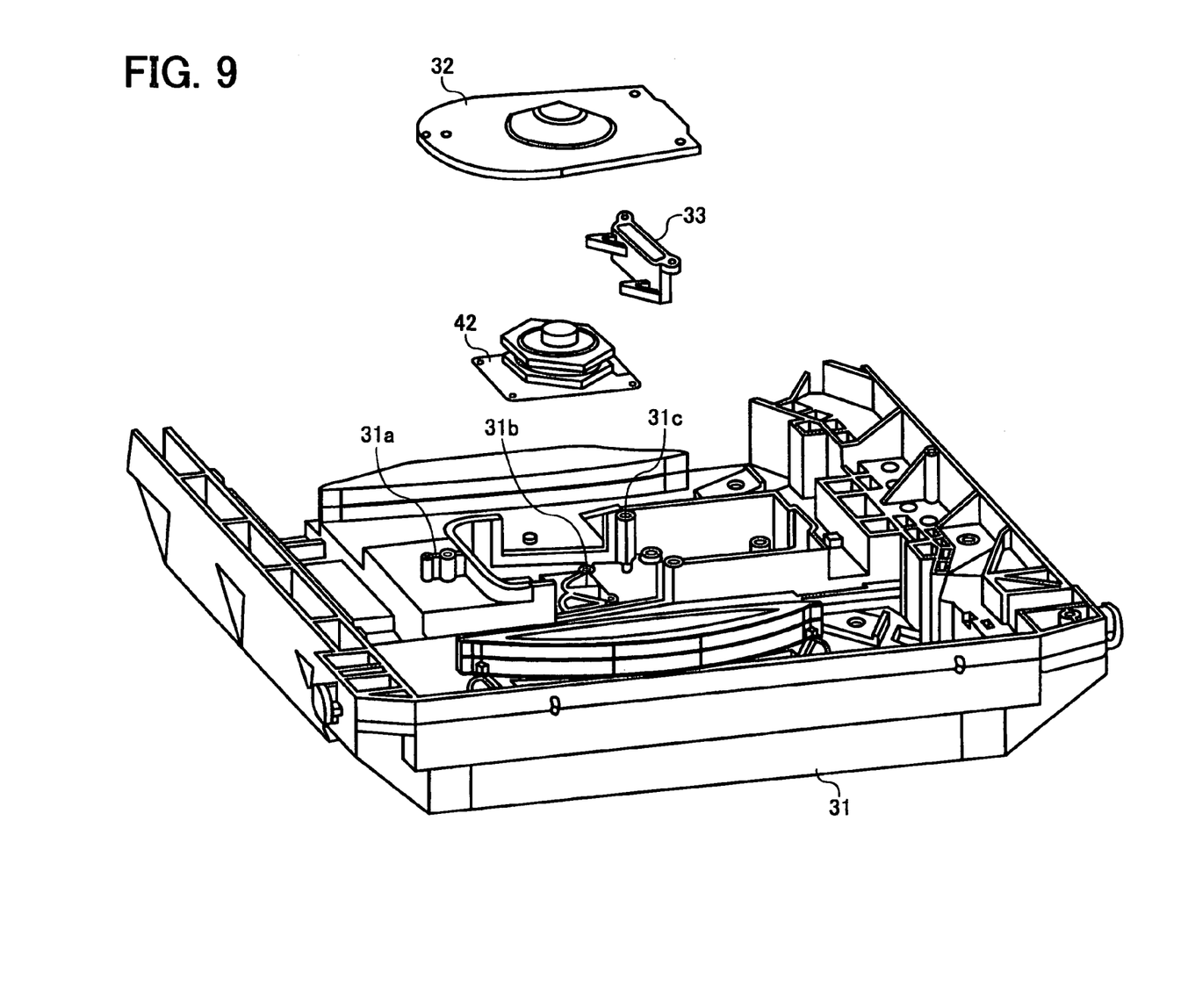
FIG. 9 is an assembly diagram of the optical scanning device around the deflector.

FIG. 9 is an assembly diagram of the periphery of the deflector 49. The housing 31 includes positioning portions of the deflector unit 42, a lid 32 that covers an upper opening of the deflector 49 and the light shielding member 33, and screw fastening portions 31a and 31b in a simple type structure. The housing 31 can be formed of a resin.

It is preferable to enclose and seal the deflector 49 by the housing that holds the deflector unit 42 including the deflector 49, the light shielding member 33 having the light shielding units 33a and 33c, a transparent window (soundproof glass 51) that transmits the light beams, and the lid covering the upper part of the deflector 49.

The housing 31 further includes a support 31c that fixes the lid 32, and positions the light shielding member 33 between the housing 31 and the lid 32 to fix the light shielding member 33. The light shielding member 33 can be fastened together with the lid 32 and the housing 31.

Because the light shielding units 33a and 33c are only required to shield light, the light shielding units 33a and 33c can have a plate-like shape. However, as shown in FIG. 4, it is preferable that the light shielding units 33a and 33c have a hollow triangular shape and have rigidity with a certain thickness in the height direction. It is further preferable that the light shielding member 33 including the light shielding units 33a and 33c has a simple type structure and a moldable shape.

Incidentally, it is also preferable that the light shielding member 33 is formed of a metal material such as copper, aluminum, or aluminum alloy to improve heat radiation performance in the space of the deflector unit 42, and the surfaces of the light shielding units 33a and 33c have appropriate surface roughness. It is further preferable that a part of the light shielding member 33 is exposed outside the optical scanning device to increase the heat dissipation effect.

A configuration of an image forming apparatus according to an embodiment of the present invention is explained next. The image forming apparatus includes the optical scanning device, a photoconductor onto which an electrostatic latent image is written by the optical scanning device, a development unit that develops the electrostatic latent image on the photoconductor into a toner image, a transfer unit that transfers the toner image onto a recording medium, and a fixing unit that fixes the toner image on the recording medium.

Figure 10:
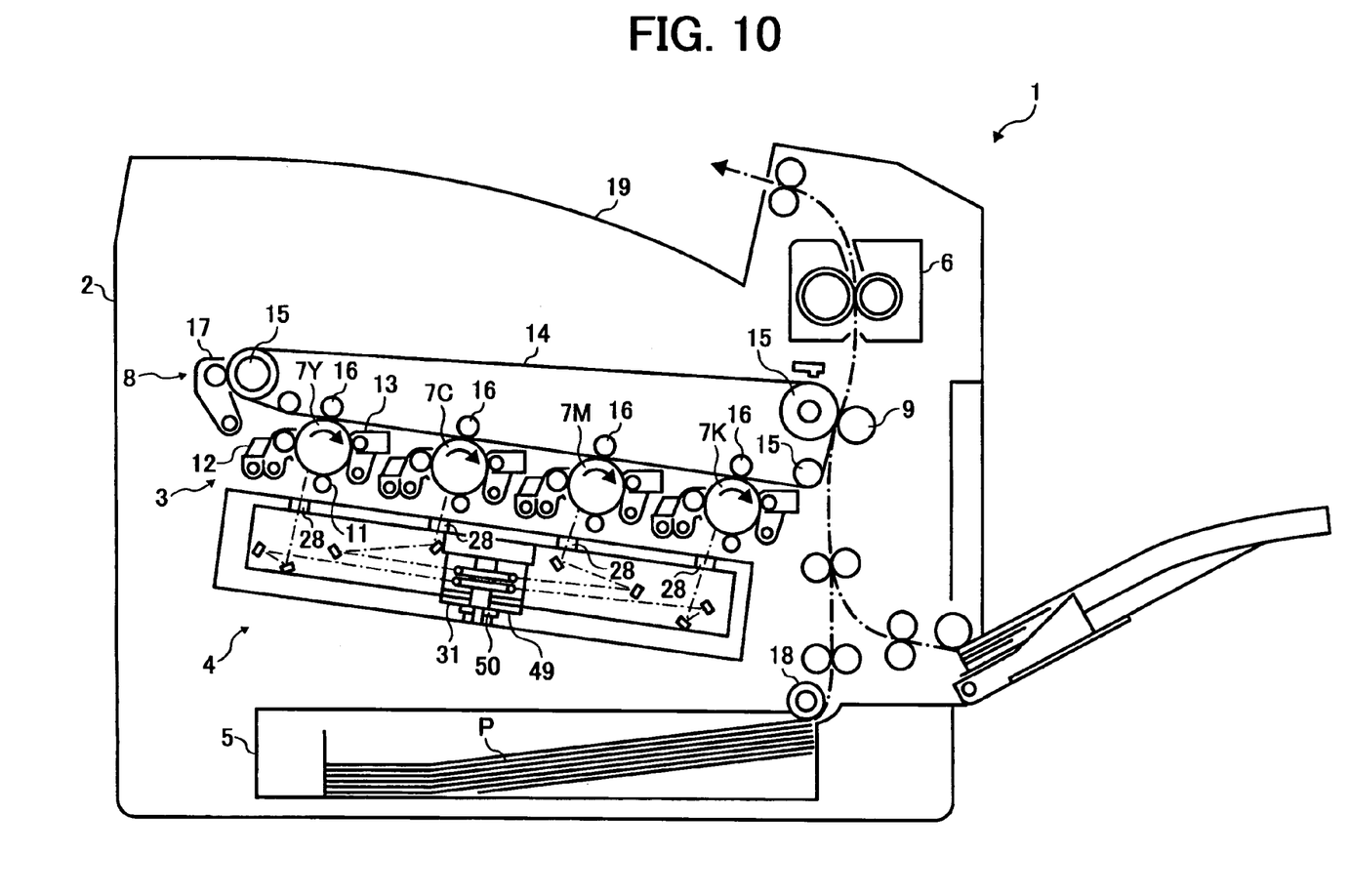
FIG. 10 is a schematic of an image forming apparatus according to an embodiment of the present invention.

FIG. 10 is a schematic of a color printer 1 as an image forming apparatus according to the embodiment. The color printer 1 includes a body case 2, and four imaging units 3 (3Y, 3C, 3M, and 3K), the optical scanning device 4 that emits light beams and an intermediate transfer belt 14, which are arranged substantially in the middle of the body case 2. The imaging units 3 respectively form an image (toner image) of a color different from each other. In the description of the specification and the drawings relating to these imaging units 3 and the components of the imaging units 3, subscripts Y, C, M, and K indicate colors of yellow, cyan, magenta, and black respectively. The body case 2 is formed of an iron frame as an image carrier holding member and a belt holding member, and a resin cover fitted to the frame, and the imaging units 3, the optical scanning device 4, and the intermediate transfer belt 14 are fitted to the frame.

The four imaging units 3Y, 3C, 3M, and 3K use toner of a different color, and hence, form images of a different color, but the basic structure thereof is the same. Each imaging unit 3 includes the photoconductor 7 (7Y, 7C, 7M, and 7K), which is an image carrier rotated in an arrow direction, a charger 11, a development unit 12, a cleaning unit 13, and the like arranged around the photoconductor 7.

The photoconductor 7 is formed in a cylindrical shape, and rotated by a drive source (not shown). A photosensitive layer is provided on an outer circumference of the photoconductor 7, and an outer circumference, which is the surface of the photoconductor 7, is a surface to be scanned. Since the light beams emitted from the optical scanning device 4 are irradiated in a spot on the outer circumference 7a of the photoconductor 7, an electrostatic latent image is written according to image information on the outer circumference 7a of the photoconductor 7.

The charger 11 uniformly charges the outer circumference 7a of the photoconductor 7, and a non-contact type charger with respect to the photoconductor 7 is employed.

The development unit 12 supplies toner to the photoconductor 7, and the supplied toner adheres on the electrostatic latent image written on the outer circumference 7a of the photoconductor 7, thereby manifesting the electrostatic latent image on the photoconductor 7 as a toner image. A non-contact type development unit with respect to the photoconductor 7 is employed.

The cleaning unit 13 cleans residual toner adhered on the outer circumference 7a of the photoconductor 7, and a brush-contact type cleaning unit, which brings a brush in contact with the outer circumference 7a of the photoconductor 7, is employed.

The intermediate transfer belt 14 is a loop belt formed by using a resin film or rubber as a base substance, and the toner image formed on the photoconductor 7 is transferred thereto. The intermediate transfer belt 14 is supported by rollers 15 and rotated in an arrow direction. These rollers 15 are fitted to the frame of the body case 2, whereby the intermediate transfer belt 14 is fitted to the frame of the body case 2 via the rollers 15. Accordingly, the rollers 15 are a belt holding member that holds the intermediate transfer belt 14, together with the frame of the body case 2. A linear coefficient of expansion of these rollers 15 is the same as that of the body case 2. Four transfer rollers 16 that press the intermediate transfer belt 14 to the photoconductors 7 to transfer the toner image on the respective photoconductors 7 onto the intermediate transfer belt 14 are arranged on an inner circumference of the intermediate transfer belt 14 (inside of the loop). A cleaning unit 17 that cleans the residual toner, paper dust, and the like adhered on the outer circumference 7a of the intermediate transfer belt 14 is arranged on the outer circumference 7a side of the intermediate transfer belt 14 (outside of the loop).

A paper feed cassette 5 on which the recording media (sheets of paper P) are accumulated and held is arranged below the four imaging units 3 and the optical scanning device 4 in the body case 2. The recording media accumulated and held on the paper feed cassette 5 are sequentially separated and fed from the one at the top.

A carrier path is formed in the body case 2, by which the recording medium separated and fed from the paper feed cassette 5 is carried. A paper feed roller 18, a resist roller, an intermediate transfer roller 9, a fixing unit 6, a paper eject roller, and the like are arranged on the carrier path.

The resist roller is intermittently rotated at predetermined timing. Since the resist roller is intermittently rotated, the recording medium carried to the position of the resist roller and halted there is fed to a transfer position where the recording medium is put between the intermediate transfer belt 14 and the intermediate transfer roller 9, and the toner image on the intermediate transfer belt 14 is transferred to the recording medium at the transfer position. Here, the transfer unit is formed of the intermediate transfer belt 14 and the intermediate transfer roller 9.

The fixing unit 6 fixes the toner image transferred to the recording medium on the recording medium by applying heat and pressure. The recording medium on which the toner image is fixed during the course of passing through the fixing unit 6 is ejected onto a paper ejection tray 19 formed on the upper face of the body case 2 by the paper eject roller.

As set forth hereinabove, according to an embodiment of the present invention, the light shielding units prevent flare light from an opposite optical system from reaching the photoconductor. The light shielding units are arranged such that the apex of the polygon deflector comes close to the ends of the respective light shielding units in different timing. Consequently, the times, at which noise is maximum, are shifted from each other. Thus, it is possible to reduce noise as a whole generated when the light shielding units approach the polygon rotor rotating at a high speed as well as to achieve sufficient light-shielding properties. Further, by covering the deflector, noise can be further reduced.

Moreover, the light shielding units are arranged only in a region required for light shielding to avoid disturbance of air flow due to the rotation of the deflector. Therefore, the windage loss can be reduced.

Furthermore, the light shielding units need not formed integrally in the housing, but can be formed separately in a desired shape in a simple manner. Besides, a notch or the like is not required in the substrate of the deflector. This construction facilitates mold change at the time of fine adjustment of the light shielding units due to the influence of flare light for an actual image.

Moreover, the light shielding units are made of a metal having good heat conductivity. Consequently, temperature rise can be suppressed in the substantially sealed space of the deflector. In addition, because heat can be radiated to the outside of the optical scanning device, a temperature rise can be further reduced in the substantially sealed space of the deflector.

Furthermore, if the light shielding units are formed in a shape that can be pulled out vertically, the mold structure can be simplified, and assembly workability is improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a plurality of light sources that are arranged separately in a height direction;
    a deflector that includes a polygon mirror, reflects light beams from the light sources on the polygon mirror while rotating, and separates the light beams in two substantially symmetrical directions to obtain deflected light beams;
    an optical system corresponding to each of the light source that guides each of the deflected light beams of a corresponding light source onto a surface of a corresponding photoconductor to form a latent image on the photoconductor;
    a plurality of light shielding units that are located outside a deflection scanning area of the deflected light beams and near the deflector, and shield flare light from an opposite optical system, wherein
    the light shielding units include first and second light shielding units, which are arranged not to satisfy the following condition $\theta = n(360/x)$ degrees where $\theta$ is an angle formed by a line from a portion of the first light shielding unit nearest the deflector to a rotation axis of the deflector and a line from a portion of the second light shielding unit nearest the deflector to the rotation axis of the deflector with the rotation axis of the deflector being an apex angle, x is number of mirror faces of the polygon mirror, and n is an integer not more than x, and wherein the first light shielding unit and the second light shielding unit are provided at different relative heights in a rotation axis direction of the deflector; and
    an upper light shielding member and a lower light shielding member that are provided at a different height in the rotation axis direction, wherein
        the upper light shielding member shields a height region where an upper part of the deflector reflects light beams,
        the lower light shielding member shields a height region where a lower part of the deflector reflects light beams, and
        the upper light shielding member and the lower light shielding member are arranged with a gap therebetween in the deflector rotating axis direction, wherein
    the upper light shielding member and the lower light shielding member each have a hollow triangular shape seen in the deflector rotating axis direction, and wherein
    the two hollow triangular shapes are symmetrically formed and symmetrically placed in line symmetry about a symmetrical line, wherein
        the symmetrical line passes a center point of the deflector seen in the deflector rotating axis direction, and
        the symmetrical line is perpendicular to the main scanning direction seen in the deflector rotating axis direction.

2. The optical scanning device according to claim 1, wherein the first and second light shielding units are arranged so that the angle $\theta$ is not less than $(m-0.4) \times (180/x)$ degrees and not more than $(m+0.4) \times (180/x)$ degrees, m being an odd number not more than 2x.

3. The optical scanning device according to claim 2, wherein x=6, and m=3.

4. The optical scanning device according to claim 1, wherein the first light shielding unit shields a height region where the deflector reflects light beams from one light source, and the second light shielding unit shields a height region where the deflector reflects light beams from another light source.

5. The optical scanning device according to claim 1, further comprising a light shielding member in which the first and second light shielding units are integrally formed.

6. The optical scanning device according to claim 1, further comprising:
    a housing that holds the deflector;
    a transparent window that transmits light beams; and
    a lid that covers an upper part of the deflector, wherein
    the deflector is enclosed and sealed by the housing, the light shielding units, the transparent window, and the lid.

7. The optical scanning device according to claim 6, wherein the light shielding units are made of a metal material.

8. The optical scanning device according to claim 7, wherein the light shielding units are partly exposed outside the optical scanning device.

9. The optical scanning device according to claim 6, further comprising a support that fixes the lid, and positions and fixes the light shielding units between the housing and the lid.

10. An image forming apparatus comprising:
    a photoconductor onto which an electrostatic latent image is written by the optical scanning device;
    a development unit that develops the electrostatic latent image on the photoconductor into a toner image;
    a transfer unit that transfers the toner image onto a recording medium;
    a fixing unit that fixes the toner image on the recording medium; and an optical scanning device including
- a plurality of light sources that are arranged separately in a height direction;
- a deflector that includes a polygon mirror, reflects light beams from the light sources on the polygon mirror while rotating, and separates the light beams in two substantially symmetrical directions to obtain deflected light beams;
- an optical system corresponding to each of the light source that guides each of the deflected light beams of a corresponding light source onto a surface of a corresponding photoconductor to form a latent image on the photoconductor;
- a plurality of light shielding units that are located outside a deflection scanning area of the deflected light beams and near the deflector, and shield flare light from an opposite optical system, wherein the light shielding units include first and second light shielding units, which are arranged not to satisfy the following condition $$\theta = n(360/x) \text{ degrees}$$

where θ is an angle formed by a line from a portion of the first light shielding unit nearest the deflector to a rotation axis of the deflector and a line from a portion of the second light shielding unit nearest the deflector to the rotation axis of the deflector with the rotation axis of the deflector being an apex angle, x is number of mirror faces of the polygon mirror, and n is an integer not more than x, and wherein the first light shielding unit and the second light shielding unit are provided at different relative heights in the rotation axis direction of the deflector; and an upper light shielding member and a lower light shielding member that are provided at a different height in the rotation axis direction; wherein
- the upper light shielding member shields a height region where an upper part of the deflector reflects light beams,
- the lower light shielding member shields a height region where a lower part of the deflector reflects light beams, and
- the upper light shielding member and the lower light shielding member are arranged with a gap therebetween in the deflector rotating axis direction, and wherein the upper light shielding member and the lower light shielding member each have a hollow triangular shape seen in the deflector rotating axis direction, and wherein the two hollow triangular shapes are symmetrically formed and symmetrically placed in line symmetry about a symmetrical line, wherein
- the symmetrical line passes a center point of the deflector seen in the deflector rotating axis direction, and
- the symmetrical line is perpendicular to the main scanning direction seen in the deflector rotating axis direction.

* * * * *